United States Patent
Greenspan et al.

(10) Patent No.: US 7,533,145 B1
(45) Date of Patent: *May 12, 2009

(54) SYSTEM AND METHOD FOR PROVIDING ENHANCED PERSISTENT COMMUNICATIONS

(75) Inventors: Steven L. Greenspan, Scotch Plains, NJ (US); Bonnie A. Nardi, Half Moon Bay, CA (US); Stephen Whittaker, Morristown, NJ (US)

(73) Assignee: AT&T Intellectual Property, II, L.P., Bedminster, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/703,022

(22) Filed: Feb. 6, 2007

Related U.S. Application Data

(63) Continuation of application No. 10/096,978, filed on Mar. 13, 2002, now Pat. No. 7,188,140.

(51) Int. Cl.
*G06F 15/16* (2006.01)
(52) U.S. Cl. .................. 709/204; 709/227; 709/228; 370/352; 370/431
(58) Field of Classification Search ............ 709/204, 709/205, 206, 207, 227–228; 370/352, 431
See application file for complete search history.

(56) References Cited

U.S. PATENT DOCUMENTS

| | | | |
|---|---|---|---|
| 6,212,548 B1 * | 4/2001 | DeSimone et al. | 709/204 |
| 6,807,562 B1 * | 10/2004 | Pennock et al. | 709/204 |
| 2002/0062345 A1 * | 5/2002 | Guedalia et al. | 709/204 |
| 2002/0143877 A1 * | 10/2002 | Hackbarth et al. | 709/205 |
| 2002/0147777 A1 * | 10/2002 | Hackbarth et al. | 709/205 |
| 2002/0152423 A1 * | 10/2002 | McCabe | 714/15 |
| 2003/0065721 A1 * | 4/2003 | Roskind | 709/204 |
| 2006/0014530 A1 * | 1/2006 | Denenberg et al. | 455/414.1 |
| 2006/0031332 A1 * | 2/2006 | Brownholtz et al. | 709/206 |

OTHER PUBLICATIONS

Jabber, Inc., "Jabber Communications Platform Architecture Description - A Technical White Paper", Dec. 1, 2001, 5 page(s).
Jabber, Inc., "Jabber WebClient 1.0 Technical White Paper", Dec. 20, 2001, 8 page(s).
Saint-Andre, "Jabber Protocol Overview", Dec. 1, 2001, 5 page(s), Jabber, Inc.

* cited by examiner

*Primary Examiner*—Thu Ha T Nguyen
(74) *Attorney, Agent, or Firm*—Michael Haynes PLC; Michael N. Haynes

(57) ABSTRACT

A system and method for providing persistent communications between users is disclosed whereby users can communicate in a real time fashion and/or in an offline or asynchronous manner within a persistent communications session without having to initiate a new session each time a user logs off or onto the communications session.

20 Claims, 4 Drawing Sheets

FIG. 3

```
      ⎧ <LOGIN USER 1>
      | <INITIATE COMMUNICATION SESSION>[COMMUNICATION SESSION ACTIVE]
      | <LOGIN USER 2>[COMMUNICATION SESSION ACTIVE]
      | <CONDUCT COMMUNICATION SESSION>[COMMUNICATION SESSION ACTIVE]
      | <RECEIVE MESSAGE FROM USER 1 FOR USER 2>[COMMUNICATION SESSION ACTIVE]
300 ⎨ <RECEIVE MESSAGE FROM USER 2 FOR USER 1>[COMMUNICATION SESSION ACTIVE]
      | <RECEIVE MESSAGE FROM USER 1 FOR USER 2>[COMMUNICATION SESSION ACTIVE]
      | <RECEIVE MESSAGE FROM USER 2 FOR USER 1>[COMMUNICATION SESSION ACTIVE]
      | <RECEIVE MESSAGE FROM USER 1 FOR USER 2>[COMMUNICATION SESSION ACTIVE]
      ⎩ <RECEIVE MESSAGE FROM USER 1 FOR USER 2>[COMMUNICATION SESSION ACTIVE]
      ⎧ <LOGOFF USER 2>[COMMUNICATION SESSION ACTIVE]
310 ⎨ <RECEIVE MESSAGE FROM USER 1 FOR USER 2>[COMMUNICATION SESSION ACTIVE]
      ⎩ <LOGOFF USER 1>[COMMUNICATION SESSION ACTIVE]
      ⎧ <LOGIN USER 2>[COMMUNICATION SESSION ACTIVE]
320 ⎨ <RECEIVE FILE FROM USER 2 FOR USER 1>[COMMUNICATION SESSION ACTIVE]
      ⎩ <LOGOFF USER 2>[COMMUNICATION SESSION ACTIVE]
      ⎧ <LOGIN USER 1>[COMMUNICATION SESSION ACTIVE]
      | <LOGIN USER 2>[COMMUNICATION SESSION ACTIVE]
330 ⎨ <RECEIVE MESSAGE FROM USER 1 FOR USER 2>[COMMUNICATION SESSION ACTIVE]
      | <RECEIVE MESSAGE FROM USER 2 FOR USER 1>[COMMUNICATION SESSION ACTIVE]
      | <LOGOFF USER 1>[COMMUNICATION SESSION ACTIVE]
      ⎩ <LOGOFF USER 2>[COMMUNICATION SESSION ACTIVE]
      ⎧ [COMMUNICATION SESSION ACTIVE]
340 ⎨     :
      ⎩     :
```

SYSTEM AND METHOD FOR PROVIDING ENHANCED PERSISTENT COMMUNICATIONS

CROSS-REFERENCE TO RELATED APPLICATIONS

This application is a continuation of, claims priority to, and incorporates by reference herein in its entirety, U.S. patent application Ser. No. 10/096,978, filed 13 Mar. 2002 now U.S. Pat. No. 7,188,140.

BACKGROUND OF THE INVENTION

This invention relates to interactive communications, and more particularly, to a method for providing enhanced persistent communications.

One of the more beneficial aspects of the Internet, aside from the vast array of information and content sources it provides, is the varied and newfound ways people can now communicate and stay in touch with one another. Users all around the world, or even just around the corner, may now communicate in a relatively low cost and efficient manner via a myriad of Internet facilities including electronic mail, chat rooms, message boards, instant messaging and video teleconferencing.

These methods of communication offer distinct advantages over standard communicative methods such as paper based mail and conventional telephone calls. For example, facilities like electronic mail are typically considerable faster and cheaper than these conventional methods of communication. Rapidly escalating in popularity is instant messaging which offers more "interactive-type" of communication since the participants in an instant messaging conversation are online simultaneously.

Internet Relay Chat (IRC) or, simply "chat" provides informal communications among users of data network facilities. Chat allows two or more users to converse by exchanging text messages, typically through a "channel" or virtual "chat room" maintained on one or more chat servers and accessed via an on-line service or using general purpose chat "client" software executing at a user terminal, workstation or personal computer. Only chat "participants" connected (typically through a telephone line modem) to the on-line service or other chat environment provided by one or more chat servers, can take part in the chat. Chat room "conversations" are displayed as text in a chat room window on a participant's display screen, usually accompanied by a list of chat participants. The text displayed at a participant's terminal usually includes a history of the conversation from the time that the viewing participant joined the chat room. Entering particular chat rooms is typically effected using a list or menu of currently available chat rooms. Exiting a chat room is usually as simple as closing the chat window. Extensions of the basic chat model of communications permit use of voice (or other audio), video and other message content.

Instant messaging (IM) allows users to be aware of the "presence" of others (usually friends or colleagues) and to send short messages back and forth to those who are present (i.e., logged into the IM server). This creates a communication channel that lends itself to shorter, more intimate, less formal conversation than email. The growth rate in IM use has been dramatic and usage is that of approaching email. When two people are communicating through an IM session there utterances are recorded in sequence in the IM session window. However, when the session is ended the utterances disappear (although they may be archived). If a message is sent to a "buddy" who is no longer logged into the IM server, then either the message is rejected ("<Person's name> is no longer available"), or saved and sent at a latter time when the other person is logged in. However, the next time the two talk to each other, a new session window is created. Also, if the other person does not log out but leaves for the day (from work) the message will be added to their current IM session. When that person logs in (at home) the new messages will not appear in their new IM session.

However, one significant problem with instant messaging, as compared to electronic mail, is that no saved record of an instant messaging conversation is available once the instant messaging conversation terminates. For example, once an instant messaging window is closed, the conversations contained therein are lost. It is conceivable that some users may take manual measures to save or archive their conversations, for example, by copy and pasting the text of their conversation into a word processor and saving the conversation in the word processor format. However, this technique and other existing techniques for saving or logging instant messaging conversations are both cumbersome and time consuming. Furthermore, saving instant messaging conversations in this prior art manner results in the user having to maintain separate repositories for these saved instant messaging conversations which places the burden on the user to both remember whether such conversations have actually been saved and in what location they have been saved.

Instant messaging has an additional benefit since it effectively blurs the distinction between synchronous and asynchronous communication. An IM message can be replied to immediately, thereby establishing a near real time conversation, or it can be replied to at a latter time. The user experience can be thought of as a private communication channel or whiteboard between two people, in which they can chat with one another. Users tend to perceive IM as a much "lighter-weight" form of communication than e-mail: It is more easily accessed, messages are more easily exchanged, and it lends itself to short informal communications (an original goal of email). However, email is clearly preferred for long detailed messages and for important messages. The reason for this is in part the persistence of email, and the mostly ephemeral character of IMs.

Currently, closing an IM session can delete all of the messages exchanged in the session (although many IM applications offer archiving). However, in most IM applications, logging in from any device (PCs or PDAs, typically) will announce the availability of a subscriber and an IM session can be re-established. If the subscriber is not logged in (i.e., unavailable) the sender will be informed that the recipient is unavailable, and the message will not be sent. In such situations, the sender can re-send the message as email or wait until the subscriber is available. Unlike most IM applications, however, ICQ will preserve an IM message until it can be sent to its recipient. When logging in, the recipient is notified of pending messages.

There is another interesting trend in personalization of communications: an increasing number of Internet users are creating personal websites, some of which detect the presence of visitors and some of which have chat rooms. Taken together, the popularity of IM, the above limitations of current IM technology and the trend in personal websites suggest a new type of communication model in which two users (buddies) should be able to establish a permanent communication session or channel.

Accordingly, it would be desirable to have a system and method for communicating in a persistent environment which combines the benefits of existing communication methods like instant messaging and personal web pages.

SUMMARY OF THE INVENTION

The present invention is a system and method for providing communication sessions in a persistent communication environment. In one embodiment, the present invention is a method for providing persistent communications, the method comprising providing a persistent communication session for one or more online communications originating from at least one message sender and destined for at least one message recipient and providing access to the persistent communication session on a persistent basis, wherein the at least one message sender and the at least message recipient may independently access the session without the session restarting, the session persisting in a static condition when no communications are received and the session being updated on a real-time basis when communications are received and the message sender and the message recipient are online.

In another embodiment, the present invention is a method comprising receiving messages from a plurality of clients, enabling simultaneous real time and off line communications between the plurality of clients and providing a repository of the communications which is accessible in a real time and an offline manner by the plurality of clients, the repository being updated in a real time fashion upon the receipt of messages from the plurality of clients.

In another embodiment, the invention is a method comprising providing an always active communication session receptive to both online and offline communications and administering the communication session by updating communications within the session regardless of the online or offline status of one or more communication participants, the communication session remaining in an always active configuration regardless of the online or offline status of the communication participants.

BRIEF DESCRIPTION OF THE DRAWINGS

FIG. 3 is an exemplary persistent communications session in accordance with the teachings of the present invention.

DETAILED DESCRIPTION OF THE INVENTION

The present invention is a system and method for providing persistent messaging communications whereby users can communicate in a real time basis and also on an independent basis in a persistent messaging environment. In the present invention, communications can be exchanged in a real time manner as is customary with traditional messaging applications but such communications can also be accomplished when one or more of the parties to a communication are offline without being subjected to the ordinary constraints of traditional instant messaging applications which require communicating parties to be both online at the same time. Furthermore, the present invention provides for a persistent auxiliary communications environment which can accommodate file attachments and a real-time scratch pad for communicating with one another.

Figure 1:
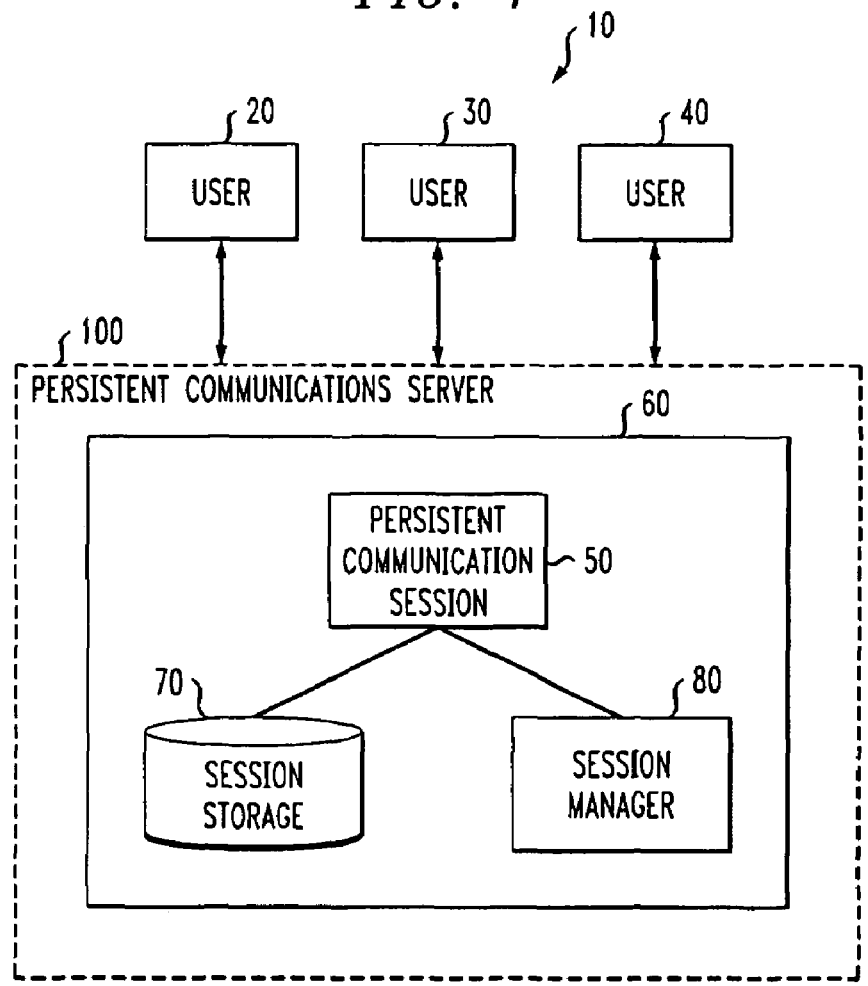
FIG. 1 illustrates an exemplary system in accordance with the teachings of the present invention.

Referring to FIG. 1, an exemplary system 10 is shown for providing communications in a persistent communication environment. As shown in FIG. 1, a number of messaging participants or users 20, 30 and 40 are engaged in a persistent communication session 50 as may be provided within a persistent communication environment 60. Persistent communication environment 60 may be administered in conjunction with a persistent communication session storage component 70 and a persistent communication manager 80. In one embodiment of the present invention, persistent communication session storage component 70 and persistent communication manager 80 reside within a persistent communications server 100 which operates within one or more networks.

In the present invention, the network or networks may be digital or analog such as may be provided over the Internet. Two examples of suitable digital networks are a packet network and a frame relay network, such as the existing packet and frame relay networks now provided by carriers such as AT&T and may involve Internet Protocol (IP) based technologies. The digital network of the present invention would generally provide interconnection utilizing various interconnection architectures including Internet Protocol (IP) based network, various existing systems such as the public switched telephone network (PSTN), ATM networks, the Internet, signaling networks, wireless networks, fixed wireless networks, DSL networks as well as other systems. The digital network would also provide versatile intelligent conduits that may carry, for example, Internet Protocol (IP) telephony or multimedia signals between the customer premises over, for example, the public switched telephone network, Internet, or wireless communication networks. Preferably, in whatever configuration, the system network will allow for transmission and receipt of incoming and outgoing communication signals.

In the present invention, users may communicate in the persistent communication session via any device which has the capability to communicate with persistent communications server 100. For example, any number of communicative devices, such as personal digital assistant (PDA) devices, wireless telephones, dedicated internet "appliances" and/or personal computers may be used to communicate with persistent communications server 100. For example, in one exemplary scenario, a first user employing a personal digital assistant (PDA) device with messaging capabilities may communicate with a second user employing a wireless telephone with messaging capabilities via persistent communications server 100. In accordance with the teachings of the present invention, the first user may communicate in a real time basis with the second users concurrently, i.e. both users are online at the same time, and additionally either user may communicate with one another in the same session even though the other user may not be online at the time. In such an example, one user may send the other user a message which is posted within the persistent communication session to the other user, even though that user may not be online or at least active within the persistent communication session at the time the message is sent. At a subsequent time, the user may see the message sent to them and may respond accordingly, again, regardless of whether the other user is online or active in that persistent communication session at that time.

In the present invention, the communication devices establish communication links either directly or indirectly to the persistent communication environment 60 using any applicable communication method or protocol such as, but not limited to, TCP/IP, RS-232, Bisync, wireless, infrared, RF, microwave, etc. which can be used to transmit communications based on a variety of access methods that permits each device to interact with the repository in a common fashion regardless of the communication protocol used or the repository implementation.

Figure 2:
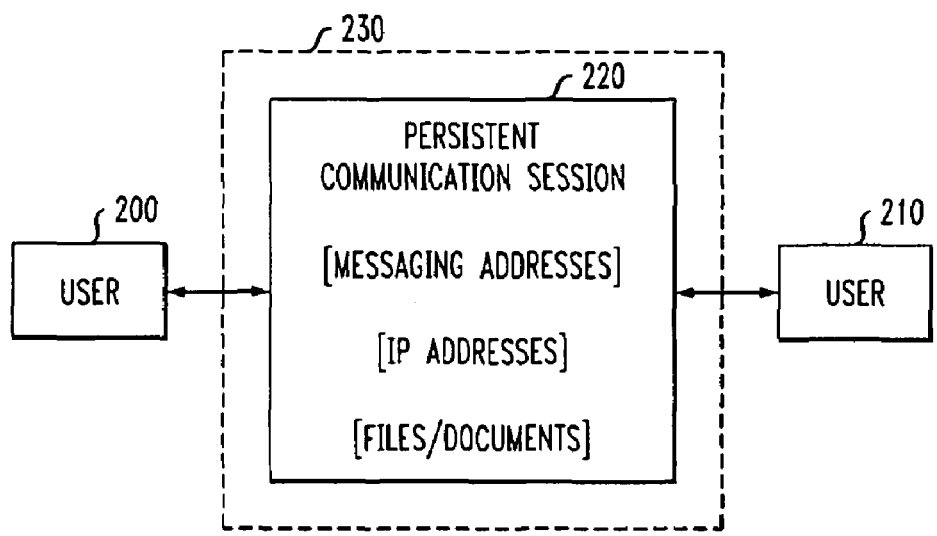
FIG. 2 illustrates a generalized system configuration in accordance with the teachings of the present invention.

A generalized abstraction of the present system is illustrated in the diagram of FIG. 2, and the following discussion is provided by way of further background toward understanding the context of the present invention. In this exemplary embodiment, two users 200 and 210 engage in a persistent communications session 220 provided within a network 230. The communications session 220 operates as a persistent repository within network 230 containing therein the user's messaging addresses, such as their instant messaging aliases, the user's IP addresses and any documents or files that may be shared between the users. Communication session 220 is provided in a live or persistent condition at all times within network 230 such that the session 220 can be unilaterally accessed by one user at any one time or bilaterally by both users at the same time, or more than two users as may be required.

An exemplary communication flow associated with the present invention is illustrated in FIG. 3, and the following discussion is provided by way of further background toward understanding the context of the present invention. This diagram illustrates an exemplary operation of the present system and other variations of the communication flow are clearly contemplated but the following is merely illustrative of the different types of communications that may exist in a persistent communication session in accordance with the presents invention. As shown in FIG. 3, within a first communications portion 300, an exemplary USER 1 and USER 2 engage in a conversation with both users logged onto the communications sessions at the same time. Within communications portion 310, only USER 2 logs off and USER 1 is logged in and a message is received from USER 1 for USER 2. Within communications portion 320, only USER 2 is logged in and a file is received from USER 2 for USER 1. Within communications portion 330, both users are again logged in and are communicating, within the communications session. Throughout each communication portion, regardless of whether any users are logged into the session, the session remains active, as shown in communications portion 340. The present invention thus allows each user or subscriber to access the persistent communications session independently from one another but if they are both present they can chat in real time. Thus, even when the other person is not logged, messages can be posted to the persistent communications session and viewed by the intended recipient at a latter time.

Figure 4:
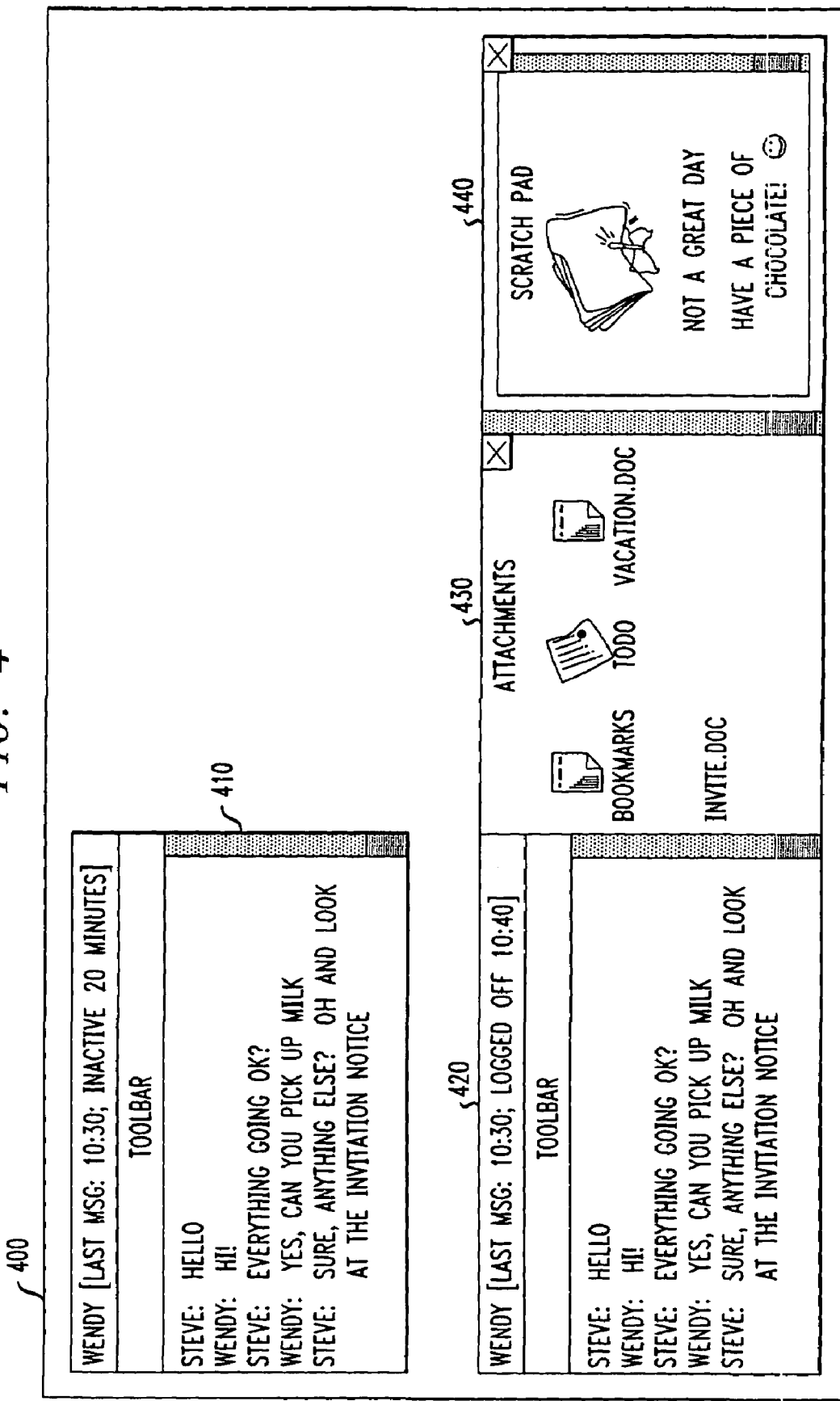
FIG. 4 is an exemplary communications session environment in accordance with the teachings of the present invention.

The present invention can be analogized to a private permanent whiteboard that is accessible only by a small set of subscribers (typically two), all of whom can modify the contents of the whiteboard. When one subscriber wishes to contact another available subscriber (a "buddy"), an alert is sent to the second subscriber (as in the current IM applications). Upon answering the alert, the instant URL is visible to the second subscriber (it was already visible to the first subscriber when the alert was sent). In one exemplary implementation, a persistent communications session may contain one to three (3) frames as shown in FIG. 4 within persistent communications session 400. The single frame version 410 is similar to what might be viewed through any current IM client. However, a single frame 420 could be expanded to include the adjoining two frames, one for attachments 430 and the other for doodling or scribbling 440.

Figure 5:
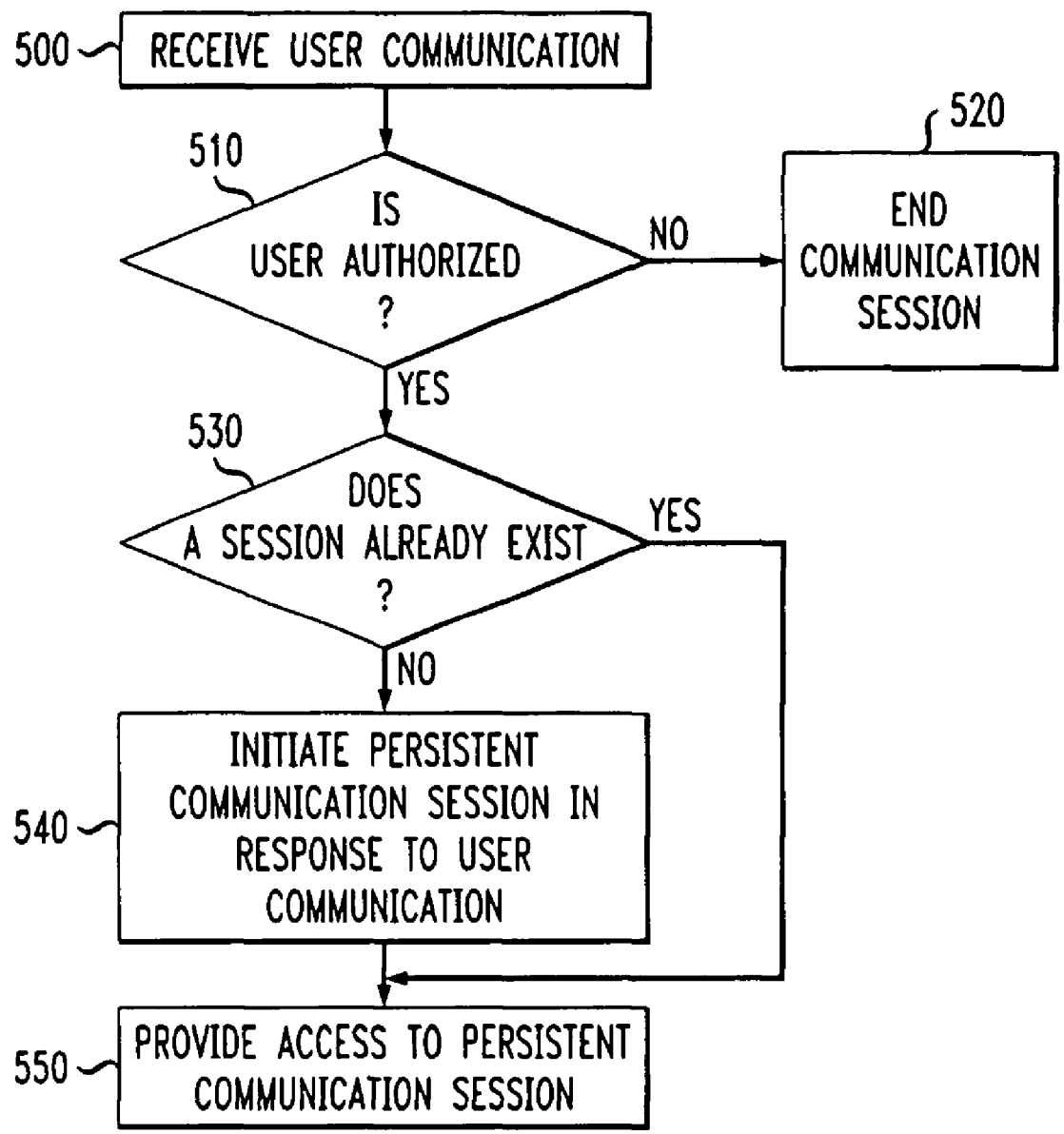
FIG. 5 is an exemplary method in accordance with the teachings of the present invention.

An exemplary method associated with the present invention is illustrated in the flow diagram of FIG. 5, and the following discussion is provided by way of further background toward understanding the context of the present invention. This diagram illustrates the operation of the basic system of FIG. 1. In this embodiment, when a client or user, such as through a browser initiates a communication with the persistent communications server. After the user's communication is received, step 500, the session manager determine whether the user has appropriate credentials or authorization, step 510. If not, the session manager will return an error message (e.g., "Unauthorized") to the user's browser and prompt the user for a user ID and password or otherwise terminate the communication session, step 520. After receiving the proper credentials from the user, such as a user ID and password from the user, the session manager verifies the user's credentials and determines if a session already exists, step 530. If a session does not already exist, the system initiates a persistent communication session, provided one is not already in progress, step 540. If a session is already in progress, the user is then provided access to the persistent communication session, step 550.

In the present invention, when a user logs into the persistent communications server their buddies are all notified (just like in current IM services). When a user invokes a communication session or channel, the other user (the buddy) is notified, and if new content is added the communication channel's window appears on the buddy's desktop (just like having an IM session window appear on the desktop). Thus, the application would look like IM to an observer. However, the permanence of a Buddy URL allows additional capabilities, e.g., being able to retrieve earlier messages from another location even if an earlier session is still active (messages that might otherwise be missed. Moreover, as explained below, other software tools can be added to Buddy URLs.

While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed, but that the invention will include all embodiments falling within the scopes of the appended claims. For example, enhancements to the present invention such as by incorporating text to speech applications such as those that can access webpages via phone, allows IMs to be received from any telephone or any internet enabled appliance (PCs, PDAs, etc), and allows voice, email, and attachments to be accessible through a IM client. Additionally, the chat space could provide inline sequencing of all messages, i.e., voice mail, email, and IMs organized by sender's time.

We claim:

1. A method comprising:

via a session manager, providing access to a communication session on a persistent basis, said session manager communicatively coupled to a repository, said session manager adapted to obtain and cause storage of each instant messaging alias and each client IP address of a plurality of clients authorized to communicate via said communication session, said communication session adapted for one or more online communications originating from at least one message sender and destined for at least one message recipient, said communication session not comprising any voice communication, said communication session not comprising a text to speech application, said session manager adapted to allow said at least one message sender and said at least one message recipient to independently access said communication session without said communication session restarting, said session manager adapted to maintain said communication session in a static condition when no communications are received, said session manager adapted to update said communication session on a real-time basis when communications are received and said at least one message sender and said at least one message recipient are online, said session manager adapted to continue said communication session without restarting when no sender and no recipient are online, said session manager adapted to provide said at least one message sender and said at least one message recipient with a representation of past activity of said communication session upon access to said communication session, wherein said communication session comprises a plurality of frames, said plurality of frames comprising a message frame, an attachment frame, and a doodling frame.

2. The method of claim 1, further comprising:
initiating said communications session.

3. The method of claim 1, wherein an alert is provided to said at least one message recipient when a message is received from said at least one message sender.

4. The method of claim 1, further comprising:
receiving one or more communications from said at least one message sender.

5. The method of claim 1, further comprising:
receiving one or more replies from said at least one message recipient.

6. The method of claim 1, wherein said plurality of frames are adjoining.

7. The method of claim 1, wherein said doodling frame is adapted to receive scribbling.

8. The method of claim 1, wherein communications are received in a first format and stored in a second format.

9. A method comprising:
via a session manager, providing access to a communication session on a persistent basis, said communications session adapted to provide access to received messages from a plurality of clients, said communications session adapted to enable simultaneous real time and off line communications between said plurality of clients, said real time and off line communications not comprising any voice communication, said real time and off line communications not comprising text to speech applications, wherein said real time and off line communications comprises a plurality of frames, said plurality of frames comprising a message frame, an attachment frame, and a doodling frame, said session manager communicatively coupled to a repository, said repository adapted to store said simultaneous real time and off line communications, said session manager accessible in a real time and an offline manner by said plurality of clients, said session manager adapted to update said repository in a real time fashion upon a receipt of messages from said plurality of clients, said session manager adapted to continue said communication session without restarting when none of said plurality of clients are online, said session manager adapted to provide said plurality of clients with a representation of past activity of said communication session upon access to said communication session, said session manager adapted to obtain and cause storage of each instant messaging alias and each client IP address of said plurality of client; authorized to communicate via said communication session.

10. The method of claim 9, wherein each client is authenticated prior to receiving one or more messages from a client of said plurality of clients.

11. The method of claim 9, wherein each client communicates via said plurality of frames.

12. The method of claim 9, wherein communications are stored in a web page format which is dynamically updated in a real time basis.

13. A method comprising:
via a session manager, providing access to a communication session on a persistent basis, said session manager communicatively coupled to a repository, said session manager adapted to obtain and cause storage of each instant messaging alias and each client IP address of a plurality of clients authorized to communicate via said communication session, said communication session receptive to both online and offline communications, said communication session not comprising any voice communication, said communication session not comprising text to speech applications, said session manager adapted to update communications within said communication session regardless of an online or offline status of one or more of said plurality of clients, said session manager adapted to maintain said communication session in an always active configuration regardless of said online or offline status of said plurality of clients, said session manager adapted to continue said communication session without restarting when none of said plurality of clients are online, said session manager adapted to provide said plurality of clients with a representation of past activity of said communication session upon access to said communication session, said session manager adapted to provide said communication session via a plurality of frames, said plurality of frames comprising a message frame, an attachment frame, and a doodling frame.

14. The method of claim 13, further comprising:
receiving communications from a client of said plurality of clients.

15. The method of claim 13, wherein at least one of said plurality of frames comprises message attachments.

16. The method of claim 13, wherein least one of said plurality of frames comprises a representation of a prior history of communications.

17. The method of claim 13, wherein communications for offline participants are posted to said communication session as if an offline participant was online.

18. The method of claim 13, wherein said communications session is provided via a persistent socket connection.

19. The method of claim 13, wherein communication session is associated with a persistent URL.

20. A method comprising:
via a session manager, providing access to a communication session on a persistent basis, said session manager communicatively coupled to a repository, said session manager adapted to obtain and cause storage of each instant messaging alias and each client IP address of a plurality of clients authorized to communicate via said communication session, said communication session adapted for one or more online communications originating from at least one message sender and destined for at least one message recipient, said communication session not comprising any voice communication, said communication session not comprising a text to speech application, said session manager adapted to allow said at least one message sender and said at least one message recipient to independently access said communication session without said communication session restarting, said session manager adapted to maintain said communication session in a static condition when no communications are received, said session manager adapted to update said communication session on a real-time basis when communications are received and said at least one message sender and said at least one message recipient are online, said session manager adapted to continue said communication session without restarting when no sender and no recipient are online, said session manager adapted to provide said at least one message sender and said at least one message recipient with a representation of past activity of said communication session upon access to said communication session.

\* \* \* \* \*